US012003951B2

United States Patent
Rafaelof et al.

(10) Patent No.: US 12,003,951 B2
(45) Date of Patent: Jun. 4, 2024

(54) STATISTICAL AUDIBILITY PREDICTION(SAP) OF AN ARBITRARY SOUND IN THE PRESENCE OF ANOTHER SOUND

(71) Applicant: UNITED STATES OF AMERICA AS REPRESENTED BY THE ADMINISTRATOR OF NASA, Washington, DC (US)

(72) Inventors: Menachem Rafaelof, Yorktown, VA (US); Kyle Wendling, Henrico, VA (US); Andrew W. Christian, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 246 days.

(21) Appl. No.: 17/708,575

(22) Filed: Mar. 30, 2022

(65) Prior Publication Data
US 2022/0322022 A1     Oct. 6, 2022

Related U.S. Application Data

(60) Provisional application No. 63/169,451, filed on Apr. 1, 2021.

(51) Int. Cl.
*H04S 7/00*       (2006.01)
*G10K 11/175*   (2006.01)
(Continued)

(52) U.S. Cl.
CPC .......... *H04S 7/303* (2013.01); *G10K 11/1752* (2020.05); *H04S 3/008* (2013.01); *H04S 2400/01* (2013.01); *H04S 2400/13* (2013.01)

(58) Field of Classification Search
None
See application file for complete search history.

(56) References Cited

U.S. PATENT DOCUMENTS

2014/0072126 A1*   3/2014   Uhle .................. H04R 29/00
                                                            381/56

OTHER PUBLICATIONS

Glasberg et al., "Development and Evaluation of a Model for Predicting the Audibility of Time-Varying Sounds in the Presence of Background Sounds". 13 pages. (Year: 2005).*

(Continued)

*Primary Examiner* — Qin Zhu
(74) *Attorney, Agent, or Firm* — M. Bruce Harper; Robin W. Edwards; Trenton J. Roche

(57) ABSTRACT

A statistical audibility prediction (SAP) method for predicting the audibility of a signal over time at a listening location, the signal from a signal source in the presence of a concurrent masking sound or masker from a masker source. The method includes receiving, via a processor over a plurality of auditory channels, a specific loudness of the signal and masker at the listening location. The method includes calculating for each auditory channel a standard deviation of a distribution of the specific loudness of the signal and masker, and calculating, via the processor, corresponding channel-specific detectability indices ($d'_{t,i}$) for each auditory channel as a function of their standard deviations. The corresponding channel-specific detectability indices are then summed to produce a total detectability index ($d'_t$), which may be output as an electronic signal that indicates the predicted audibility vs. time, e.g., to a downstream process and/or system or offline.

20 Claims, 10 Drawing Sheets

(51) Int. Cl.
*G10L 25/48* (2013.01)
*H04B 1/66* (2006.01)
*H04S 3/00* (2006.01)

(56) References Cited

OTHER PUBLICATIONS

Schell-Majoor, et al., "Application of psychophysical models for audibility prediction of technical signals in real-world background noise," Applied Acoustics, 2015, pp. 44-51, Issue 88.

Moore, et al., "A Model for the Prediction of Thresholds, Loudness, and Partial Loudness," Journal of the Audio Engineering Society, Apr. 1997, pp. 224-240, vol. 45, No. 4.

Glasberg, et al., "Development and evaluation of a model for predicting the audibility of time-varying sounds in the presence of background sounds," Journal of the Audio Engineering Society, Oct. 2005, pp. 906-918, vol. 53, No. 10.

Dau, et al., "A quantitative model of the "effective" signal processing in the auditory systern. II. Simulations and measurements," Journal of the Audio Engineering Society, Jun. 1996, pp. 3623-3631, vol. 99, No. 6.

* cited by examiner

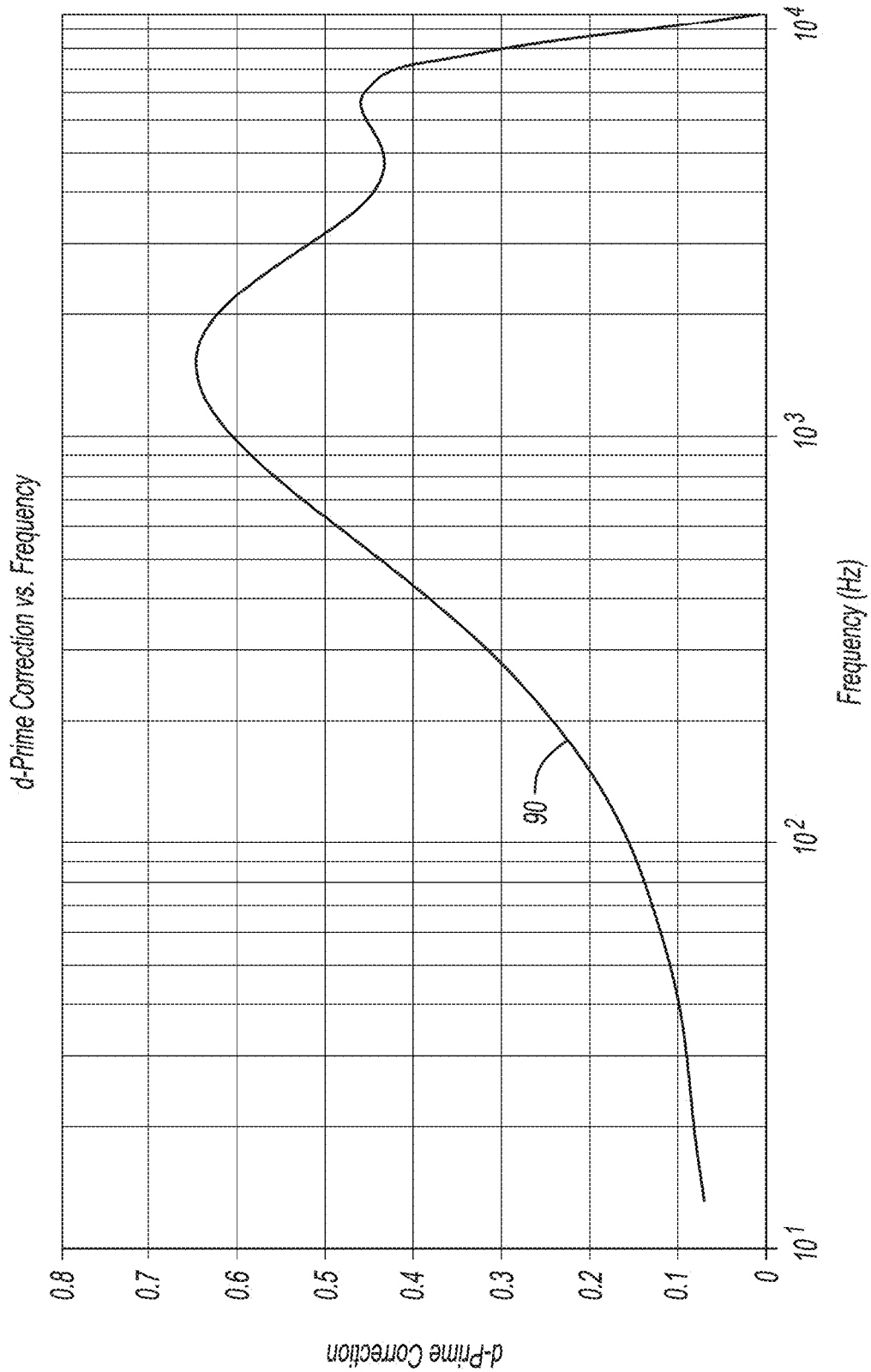

STATISTICAL AUDIBILITY PREDICTION(SAP) OF AN ARBITRARY SOUND IN THE PRESENCE OF ANOTHER SOUND

CROSS-REFERENCE TO RELATED PATENT APPLICATION(S)

This patent application claims the benefit of and priority to U.S. Provisional Patent Application Ser. No. 63/169,451, filed on Apr. 1, 2021, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

The human ear is able to perceive sound within a frequency range of about 20-Hertz (Hz) to 20-kHz, with the sound effectively parsed by the inner ear into discrete bands referenced herein as auditory channels. Human perception of sound is based on the cooperative sound-transmitting functionality of auditory ossicles arranged within the middle ear, i.e., the incus, malleus, and stapes. In a healthy ear, incident sound pressure waves cause the tiny bones and basilar membrane of the inner ear to vibrate, which the brain interprets as sound. Sound as perceived by a given listener may be relatively loud or quiet, for instance at different time of the day, week, month, or year, under different ambient conditions, levels of hearing loss, and the possible presence of competing ambient/background noise or masking signals ("maskers").

In general, loudness refers to a listener's auditory perception of the relative strength or intensity of incident soundwaves. Sound perception is non-linear due to variations in sound level and frequency. Intensity, which is stated logarithmically in decibels (dB), is commonly defined as power per unit area of an emitted train of soundwaves. The concept of loudness also captures the perceived strength of sound due to an increase in its bandwidth, temporal buildup and decay, and possible frequency masking. Due to the importance of loudness, various models of time-varying loudness have been developed, principally ISO 532-1 and DIN 45631/A, to estimate loudness perception based on a basic functional understanding of the human auditory system. However, the accurate prediction of audibility of an arbitrary sound in the presence of other arbitrary sounds remains a difficult task.

SUMMARY

Disclosed herein is a computer-executable statistical methodology that enables accurate audibility predictions of an arbitrary sound, referred to hereinafter for simplicity as a "signal", in the presence of one or more other arbitrary sounds, i.e., the above-noted masking signal or "masker". The actual identity and source of the signal and masker in any particular application of the present teachings will vary. For illustrative consistency, therefore, non-limiting examples are provided below in which the signal is sound emitted by an airborne drone, and the masker is sound emitted by a passing truck, thus representing a commonplace urban use scenario. However, actual implementations of the disclosed solutions may consider different signal and masker sources, e.g., powertrains, heating, ventilation, and air conditioning (HVAC) systems, machinery, alarms, ambient background noise, etc., with the masker possibly composed of multiple sound sources.

The underlying computer-implemented process is referred to hereinafter as a Statistical Audibility Prediction (SAP) method. Associated computer device(s) are programmed with the necessary code or algorithms to perform the SAP method, and thus are referred to herein collectively as an SAP device. The SAP device in turn has at least the requisite processor(s), memory, and other hardware for performing the described audibility prediction tasks. Various offline or downstream control actions, system responses, and/or design improvements may be optionally triggered using a calculated total detectability index, denoted herein as d' and generated by the SAP device, with d' being an aggregation of auditory channel-specific detectability indices $d'_i$, with the subscript i representing the $i^{th}$ auditory channel or filter, as appreciated in the art. In some embodiments, the SAP method may be implemented as computer-readable instructions, e.g., an algorithm or a set of code, which may be recorded on a computer-readable storage medium and executed by the processor.

As noted above, the accurate prediction of signal audibility in the context of a masker remains difficult, which largely stems from the need to handle an infinite combination of sounds with unique time and frequency characteristics. At the same time, one must account for uncertainty in the overall audibility prediction process, as well as the complex functions of the human auditory system. In spite of this, audibility predictions remain desirable in environments in which competing sounds are present. Example applications benefitting from accurate audibility predictions include the design and manufacturing of machines for air, land, or water-based transportation, machines operating in hospitals or at home, HVAC systems, industrial machines, etc. Audibility prediction is also useful for the design or assessment of soundscapes in the study of the impact of noise from transportation vehicles in residential and other communities. In still other applications, an improved audibility prediction capability would ensure that speech or critical devices such as alarms or telephones are audible in the presence of ambient sounds or background noise.

Existing models for predicting audibility of time-varying sound signals in the midst of one or more concurrent maskers are suboptimal in terms of accuracy. Essentially, such models rely on instantaneous partial loudness (IPL), i.e., the loudness of the signal relative to the masker for an instant in time, or for a single spectrum. IPL is usually computed as an aggregation of the differences between the specific loudness, i.e., loudness measured through individual auditory channels, of the signal and masker across all auditory channels. This approach results in loss of frequency information and the ability to capture audibility cues through individual auditory filters or channels. In contrast, the present approach computes the detectability index $d'_i$ per auditory channel as the sounds occur, in order to properly capture all frequency and time variances, then aggregates the various $d'_i$ values over time (t) to obtain the above-noted total detectability index $d'_i$. In this manner the present approach predicts audibility of the signal when the signal is at levels below that of the masker.

In a particular embodiment, an SAP method is provided for predicting audibility vs. or over time (t), at a listening location, of a signal from a signal source in the presence of a masker from a masking source. The SAP method includes receiving, via a processor over a plurality of auditory channels, a specific loudness of the signal at the listening location and a specific loudness of the masker at the listening location. The signal and the masker are concurrent signals. The method also includes calculating, via the processor for each respective of the auditory channels, a standard deviation of a distribution of the specific loudness of the signal, and a standard deviation of a distribution of the specific loudness of the masker.

Additionally, the method in accordance with this embodiment includes calculating, via the processor, corresponding channel-specific detectability indices ($d'_i$) for each respective one of the auditory channels as a function of the standard deviation of the distribution of the signal and the standard deviation of the distribution of the masker, as well as aggregating the corresponding channel-specific detectability indices ($d'_{t,i}$) to produce a total detectability index ($d'$). The method additionally includes outputting the total detectability index ($d'$) as an electronic signal indicative of the predicted audibility vs. or over time of the signal.

Outputting the total detectability index ($d'_t$) as an electronic signal may include transmitting the electronic signal to a downstream process and/or system via the processor. Aggregating the channel-specific detectability indices ($d'_{t,i}$) may include using a Root of Sum of Square (RSS) relation, e.g., by solving the equation:

$$d'_t = \left(\sum_{i=1}^{i=p} (d'_{t,i})^2\right)^{\frac{1}{2}}$$

Some embodiments entail modifying a design and/or an operation of the signal source in response to the electronic signal, or modifying a design and/or an operation of the listening location in response to the electronic signal.

An aspect of the disclosure includes recording the signal and the masker as recorded input signals, and then calculating the specific loudness of the signal and the specific loudness of the masker using the recorded input signals.

Calculating the channel-specific detectability indices ($d'_{t,i}$) in some embodiments includes solving via the processor, at time (t) for each respective one (i) of the auditory channels, the following equation:

$$d'_{t,i} = \frac{\text{mean}(ISPL_i)}{\sqrt{0.5(\sigma^2_{m\,t,i} + \sigma^2_{s\,t,i}) + \sigma^2_{ci}}} + k_i$$

where t is time, i is the auditory channel (e.g., frequency band), mean (ISPL) is the mean instantaneous specific partial loudness, $\sigma_s$ is the standard deviation of the distribution of the signal, $\sigma_m$ is the standard deviation of the distribution of the masker, $\sigma_c^2$ is a predetermined correction factor, and $k_i$ is a frequency-dependent correction value for an $i_{th}$ auditory channel to account for the ability to hear the signal below a level of the masker.

Selectively adding the frequency-dependent correction value when the value of $d'_t$ in each auditory channel exceeds 0.15.

Another aspect of the disclosure includes a computer-readable storage medium on which is recorded instructions for predicting audibility over time, at a listening location, of a signal from a signal source in the presence of a masker from a masking source. Execution of the recorded instructions by a processor of a statistical audibility prediction device causes the processor to perform the above-summarized method.

The above features and advantages, and other features and advantages of the present disclosure, will be readily apparent from the following detailed description of the embodiment(s) and best mode(s) for carrying out the disclosure when taken in connection with the accompanying drawings and appended claims.

BRIEF DESCRIPTION OF THE SEVERAL VIEWS OF THE DRAWINGS

FIG. 11 is a plot of detectability correction values vs. frequency to account for the ability to hear signals below the level of the masker.

Figure 1:
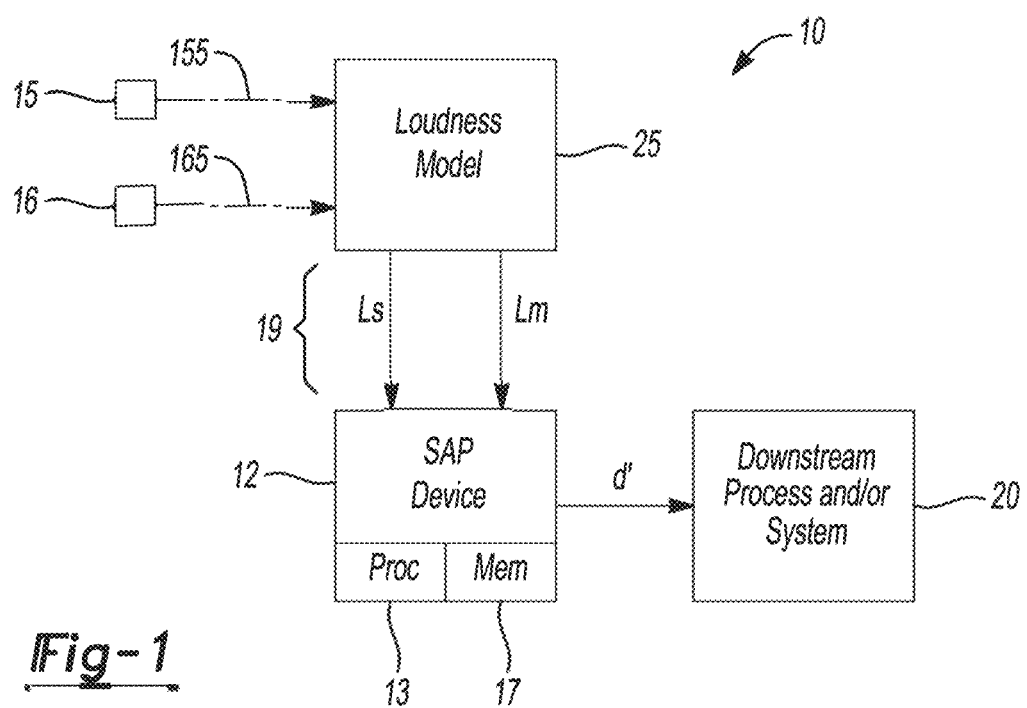
FIG. 1 is a schematic flow diagram for implementing a computer-executable embodiment of the present Statistical Audibility Prediction (SAP) method.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Several embodiments of the present disclosure are illustrated in the accompanying drawings. The same or similar reference numerals are used in the drawings and the supporting description to refer to the same or similar structure. The drawings are provided in simplified form and, unless otherwise noted, are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure. The specific devices and processes illustrated in the drawings and described herein are exemplary embodiments of the inventive concepts defined in the appended claims. Hence, specific dimensions and other physical characteristics relating to the embodiments disclosed herein, if used, are not to be considered as limiting unless the claims expressly state otherwise.

Figure 2:
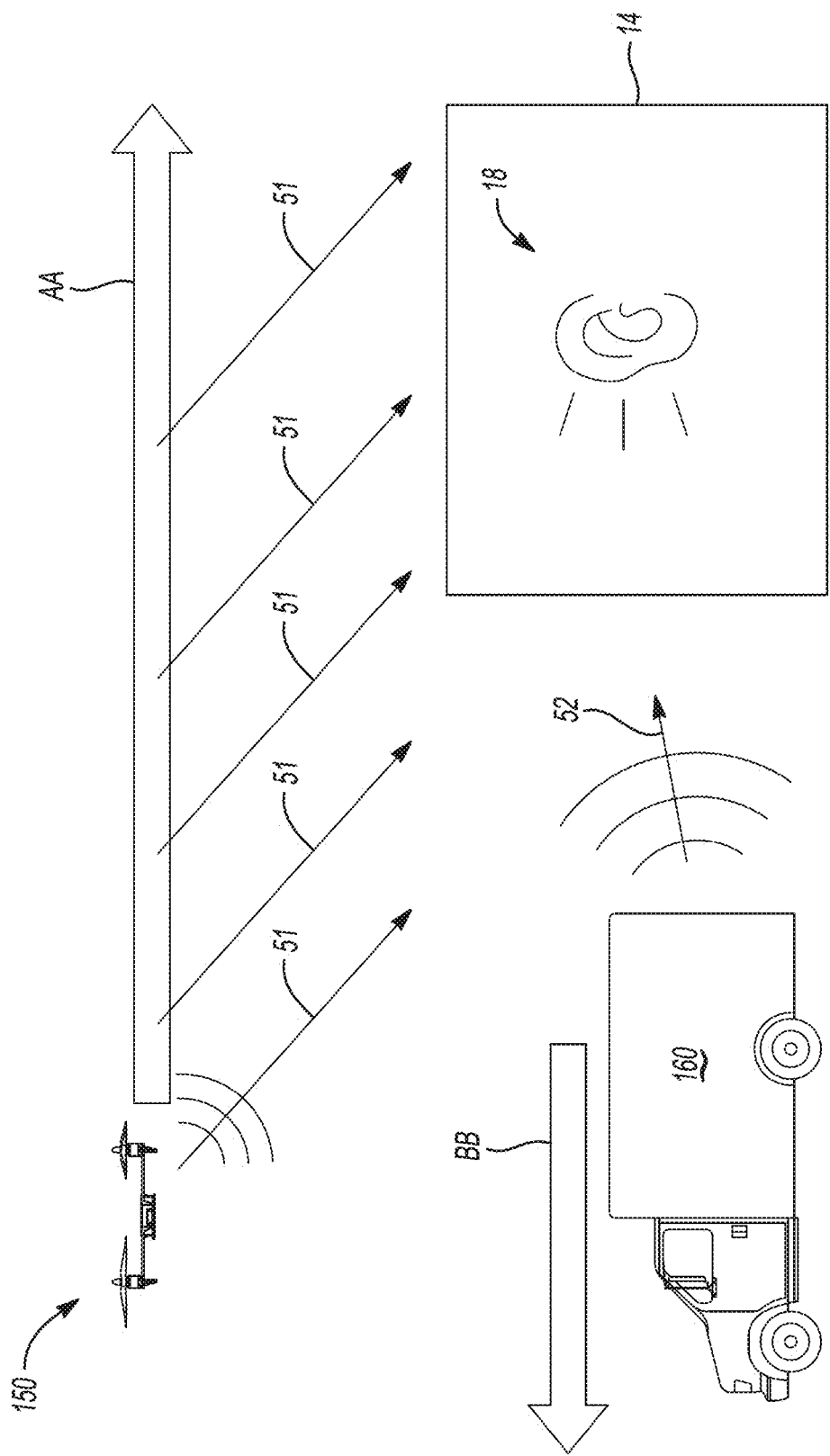
FIG. 2 illustrates a non-limiting exemplary scenario in which time-varying sounds emitted by an airborne drone and a ground vehicle are detected by a human listener.

Referring to FIGS. 1 and 2, a Statistical Audibility Prediction (SAP) method 10 is depicted in FIG. 1 in block diagram form for illustrative clarity. Performance of portions of the SAP method 10 by a suitably-equipped SAP device 12, i.e., one or more computer devices as described below, facilitates accurate predictions of sound audibility, specifically at a given listening location 14 (FIG. 2) of a signal 15S of sound pressure vs. or over time from a signal source 15, in the presence of a masking signal 16S of sound pressure vs. or over time from a masking source 16. For illustrative simplicity, the signals 15S and 16S are referred to hereinafter as the signal 15S and the masker 16S, respectively.

By way of a non-limiting illustrative example, FIG. 2 depicts an ear 18 of a subject human listener present at the listening location 14 and exposed to different time-varying arbitrary sounds 51 and 52. One of the sounds 51 or 52 is considered herein to be the above-noted signal 15S of FIG. 1, while the other functions as the masker 16S. Solely for illustrative consistency, sound 51 is considered herein in the representative example scenario of FIG. 2 to be the signal 15S of FIG. 1, with sound 52 in such a case serving as the masker 16S. Those skilled in the art will appreciate that additional sounds may be audible at the listening location 14, and therefore the simplified example of FIG. 2 is non-limiting and merely illustrative of the present teachings.

In keeping with the exemplary scenario of FIG. 2, the signal source 15 of FIG. 1 may be embodied as an unmanned aerial vehicle or drone 150 as shown, or other manned or unmanned aircraft. In the same scenario, the masking source 16 shown in FIG. 1 may be embodied as a noise-emitting ground vehicle, e.g., a truck 160, that may be configured to emit the arbitrary sound 52. For simplicity, the masking source 16 is depicted here as a single source. However, in actual applications the masking source 16 may include multiple masking sources 16, e.g., the masker could be a recording of collective noise in an environment, regardless of the number and identity of the constituent masking sources 16.

At times, sound 52 from the truck 160 will obscure or mask the sound 51 from the drone 150. For example, the listener positioned at or near the listening location 14 of FIG. 2 may wish to hear the drone 150 as the drone 150 travels overhead in the direction of arrow AA. However, the sounds 52 from the truck 160, shown traveling away from the listening location 14 and ear 18 in the direction of arrow BB, may render the sound 51 temporarily inaudible. In this and countless other scenarios, the SAP method 10 of FIG. 1 may be used to predict the audibility of the signal 15S of FIG. 1 in the present of the masker 16S, with the exemplary drone 150 and truck 160 of FIG. 2 once again being just one possible example of two sound-generating devices.

In particular, SAP device 12 of FIG. 1 as contemplated herein includes one or more digital computers having at least one processor ("Proc") 13 and application-sufficient amounts of memory ("Mem") 17. The SAP device 12 in some embodiments may be connected to or in remote/wireless communication with a downstream process and/or system 20, such that a total detectability index (d'), calculated in a particular manner by the SAP device 12 as described in detail below, is ultimately usable by the downstream process and/or system 20, e.g., to modify a design and/or an operation of the signal source 15 of FIG. 1 and/or the listening location 14 of FIG. 2. d' may be calculated in real time, while other approaches may calculate d' offline.

For example, the downstream process and/or system 20 may be selectively modified such that the signal 15S is rendered more audible, the masker 16S is rendered less audible, or to accomplish both objectives as the situation warrants. While auditory channel-specific detectability indices ($d'_i$) are described in detail below, for the purposes of this initial discussion $d'_i$ is defined as the standardized difference between respective distribution means of the signal 15S and masker 16S on a given auditory channel (i). Because the difference between the means of the distributions/two density functions is a function of amplitude, $d'_i$ is effectively an index of the detectability of a given signal for a given observer, and this is referred to as the detectability index.

The SAP method 10 shown in FIG. 1 in an exemplary embodiment includes receiving, via the processor 13 over a plurality of auditory filters or channels, a set of loudness information $L_s$ and $L_m$ of the signal 15S and masker 16S, respectively. As used herein, $L_s$ and $L_m$ are the specific loudness of the signal and masker vs. or over time, made available via a corresponding loudness model 25. Thus, $L_s$ and $L_m$ will be a two-dimensional array that is y elements long, with y being an integer representing the number of time instances, and the above-noted thirty-nine (39) elements wide representing the number of auditory channels. The loudness information $L_s$ and $L_m$ thus acts as input signals 19 to the SAP device 12. As described in further detail below, the loudness information $L_s$ and $L_m$ as contemplated herein may include, in an exemplary embodiment, a computed or modeled instantaneous loudness (IL for simplicity), instantaneous specific loudness or ISL, and instantaneous specific partial loudness or ISPL, corresponding calculations of which are detailed separately below.

Figure 3:
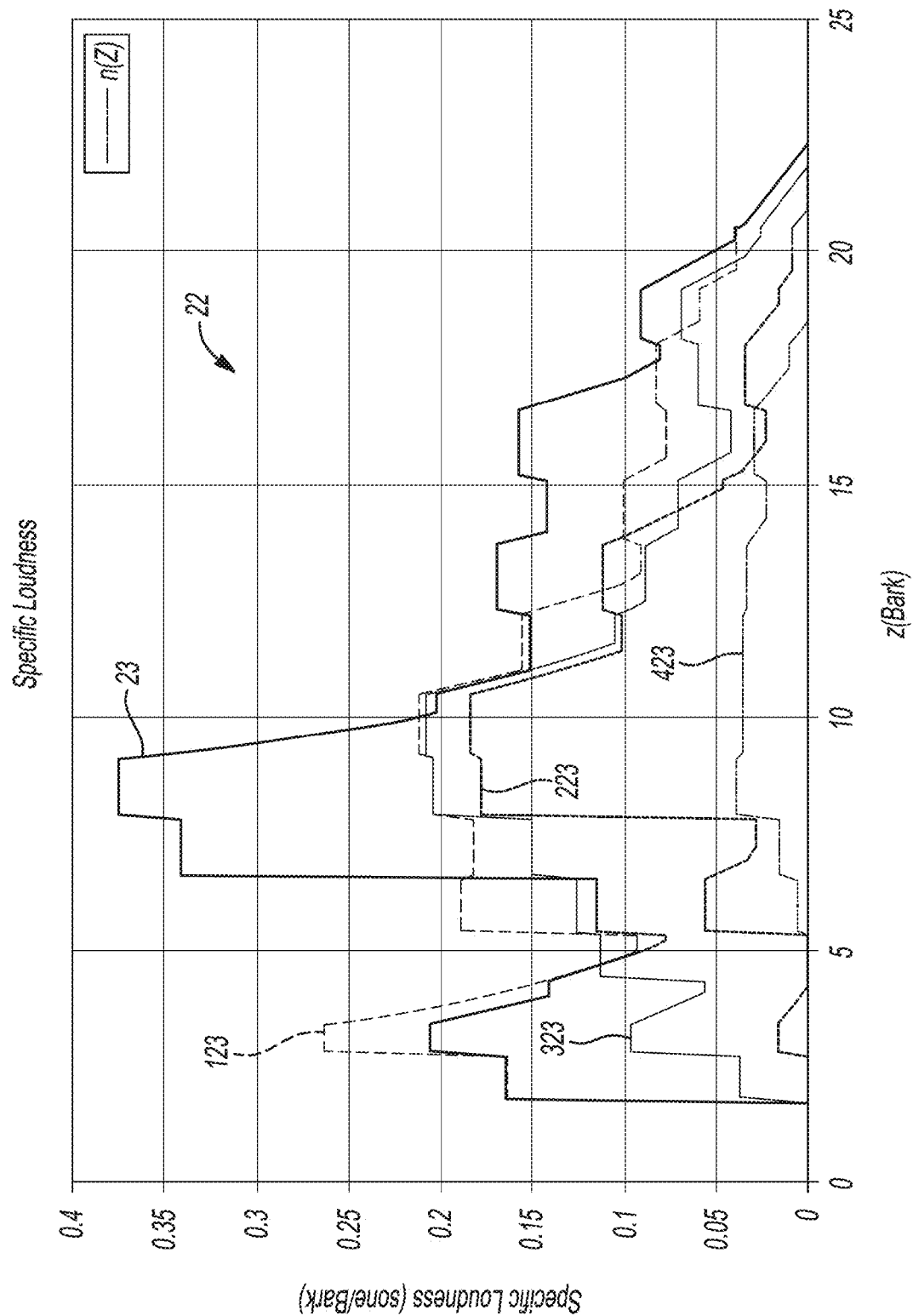
FIG. 3 is a representative plot of specific loudness at different time instants, with specific loudness depicted on the vertical axis and frequency depicted on the horizontal axis.

Referring briefly to FIG. 3, exemplary plots 22 of ISL, i.e., loudness per unit of frequency, i.e., per auditory channel, are represented for a specific instant in time. ISL is depicted in sone/Bark on the vertical axis, with sone being a representative unit of loudness. The bands (z(Bark) in this particular instance) are depicted on the horizontal axis. As appreciated in the art, two typical loudness computation methods use (1) Equivalent Rectangular Bandwidth (ERB) as the frequency scale, and (2) the noted Bark scale. Either approach may be used within the scope of the present disclosure, without limitation.

Each curve 23, 123, 223, 323, and 423 shown in FIG. 3 represents ISL for one time instant. As appreciated in the art, frequency in hertz (Hz) may be mapped into discrete bands within the inner ear and described using the Bark scale. As likewise appreciated in the art, the Bark scale is generally defined such that each critical band of human hearing has a width of one Bark. Using the Bark scale, a closer correspondence may be obtained with spectral information processing actually occurring within the ear, e.g., ear 18 of FIG. 2, with the Bark scale ranging from 1 to 24 and corresponding to the first 24 critical bands of hearing. Thus, total loudness of a given sound at any given instant in time is the total area under a given one of the curves 22, i.e., the spectral density.

Referring again to FIG. 1, as part of the present strategy the signal 15S and the masker 16S are concurrent, although not necessarily of the same duration. However, the signal 15S and masker 16S being of the same duration may be optimal due to the resulting one-to-one nature of the detectability index $d'_i$ for each time instant. Otherwise, the SAP method 10 must explain d' when the signal or masker are absent. The SAP method 10 described herein also includes calculating, via the processor 13 for each of the noted auditory channels, a standard deviation of a respective distribution of the signal 15S and masker 16S. When performing specified steps of the SAP method 10, the processor 13 of FIG. 1 also calculates the per-channel detectability index ($d'_{t,i}$) as a function of the standard deviations, aggregates the per-channel detectability indices $d'_{t,i}$ to derive the total detectability index d', and then outputs the total detectability index $d'_t$ to the downstream process and/or system 20, for instance as an electronic signal indicative of the predicted audibility, or offline.

The SAP device 12 as envisioned herein may include one or various combinations of Application Specific Integrated Circuit(s) (ASIC), Field-Programmable Gate Array (FPGA), electronic circuit(s), central processing unit(s), e.g., microprocessor(s). Associated non-transitory, computer-readable storage media in the form of the memory 17 may include sufficient amounts of tangible, non-transitory memory, e.g., read only memory, flash memory, optical and/or magnetic memory, electrically-programmable read only memory, and the like. The memory 17 also includes sufficient transient memory such as random access memory and electronic buffers. Hardware components may include, among other things, a high-speed clock, analog-to-digital and digital-to-analog circuitry, and input/output circuitry and devices, as well as proper signal conditioning and buffer circuitry.

Still referring to FIG. 1, the input signals 19 to the SAP device 12 may be derived from an application suitable embodiment of the loudness model 25, which in turn may be of any number of types used in the acoustical arts. For example, the loudness model 25 may be implemented as detailed in ISO 532-1 and DIN 45631/A1, as a so-called "G&M model" of a suitable type developed by B. R. Glasberg and B. C. J. Moore, or as another application suitable model. Computation of the loudness information $L_s$ and $L_m$ may be performed by the loudness model 25, which in turn may model transmission of sound through the outer and middle ear of the listener and parsing of the same into the above-noted auditory channels.

Loudness Model: as appreciated in the art, the loudness model 25 may receive mono or binaural sound data in either free or diffuse fields as inputs. Sound transmitted to the ear drum, e.g., of the ear 18 shown in FIG. 2, may be represented using a filter with a fixed response representing the effect of the outer ear, followed by another transformation representing the middle ear transfer function. Since transmission characteristics of the middle ear cannot fully account for the additional rise in the absolute threshold of hearing at lower frequencies, an additional correction is often made to match the absolute threshold. Accordingly, this includes increasing attenuation with decrease in frequency below about 500 Hz to represent reduced gain from the cochlear amplifier. The reduced gain for its part prevents low-frequency noise within the cochlear of the ear 18 from being audible.

Calculation of excitation patterns: also within the cochlea, acoustic energy is transduced to neural signals. This transduction is the outcome of the motion of the basilar membrane converted to neuron signals by hair cells located along the length of the basilar membrane. Because of changes in the stiffness of the BM along its length, resonance motion of BM and hence the output of the hair cells represent transduction of sound to its constituent frequency components. This transduction is modeled by a bank of auditory channels as auditory filters, with center frequency-dependent and level-dependent shapes. The model assumes that auditory filter sensor frequencies are limited to the range of 50-Hz to 15-kHz. The bandwidth increases with the center frequency, and may be expressed for moderate sound levels as equivalent rectangular bandwidth ($ERB_N$) in Hz.:

$$ERB_N = 24.7(0.00447 f_c + 1)$$

where $f_c$ is the center frequency in Hz.

The magnitude of outputs of individual auditory filters in this exemplary implementation of the loudness model 25 represents the excitation pattern for a given sound. The loudness model 25 may compute this excitation pattern at 1-ms time intervals. This representation of excitation also captures the effect of frequency masking during which a frequency component(s) of sound may be partially or fully masked because of excitation present within the same or neighboring lower frequency auditory filter.

Calculation of ISL from Excitation: to convert the excitation at each center frequency to specific loudness (N') the value of excitation (E) is expressed relative to the excitation that would be produced by a 1-kHz sinusoid at 0-dB sound pressure level (SPL) originating within a free field under frontal incidence. The basic relationship between N' and E is based on a compressed internal effect evoked by excitation as:

$$N' = CE^\alpha$$

where C and $\alpha$ are constants and $\alpha < 1$.

The value of a is selected such that the predicted loudness of a mid-frequency tone with a level above 40-dB SPL would approximately double for each 10-dB increase in sound level to match empirical data. The loudness model 25 further relies on the above equation for N' to define different expressions for N' based on the level of sound relative to the absolute threshold of hearing. Computation of N' at 1-ms time intervals represents its instantaneous value. This instantaneous representation is not meant to model conscious perception, since perception of loudness depends on the integration of neural activity over longer times than 1-ms.

Calculation of Instantaneous Total Loudness: overall instantaneous total loudness may be obtained by summing the specific loudness over a plurality (p) of auditory channels, of which there are conventionally considered to be 39 for the equivalent rectangular bandwidth, i.e., p=39:

$$N = \sum_{i=1}^{i=p} N'(i) \qquad (i)$$

for i=1, 2, 3, . . . , p.

Detectability Index (d'): as appreciated in the art, Signal Detection Theory (SDT) enables discrimination of one stimulus when in the presence of another. According to SDT, the problem of discrimination or detection involves a statistical decision that relies on testing of statistical hypotheses. Accordingly, the internal response of an observer is based on events and fixed time intervals, and whether a time interval includes a response due to background noise or signal. SDT assumes the internal response follows a specific probability distribution depending on whether the signal is present or absent. Here, decisions by an observer are based on events in time-fixed intervals, and whether a time interval includes the background/masking signal or the acoustic signal.

Figure 4:
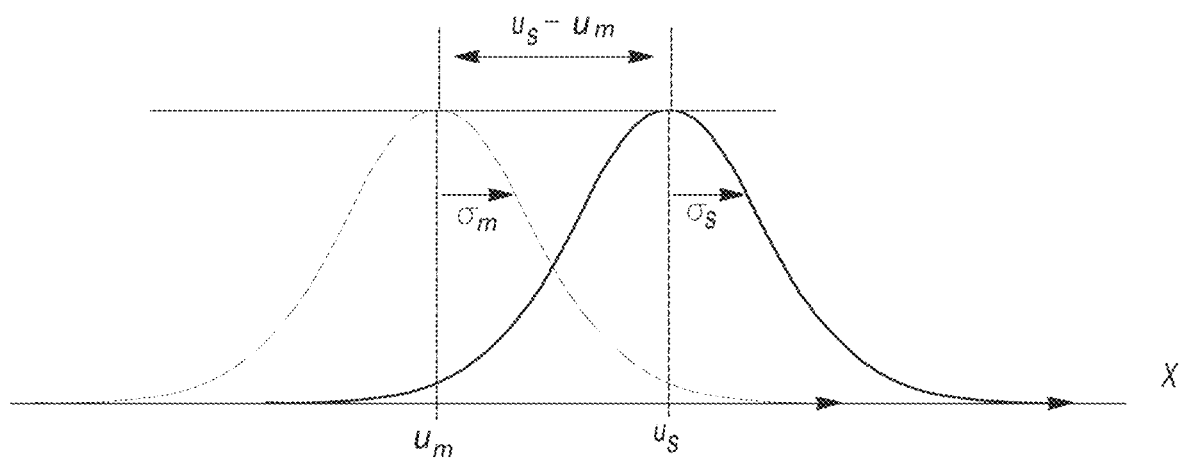
FIG. 4 is representative of normalized plots of exemplary signal and masker sound pressure distributions as used herein.

As shown in FIG. 4, SDT also assumes that observations arise with a specific probability from either the signal or the masker, i.e., the signal (represented by subscript s) or masker (subscript m) of FIG. 4. In this context, as represented in the general equation below, the detectability index is defined as the standardized difference between the means of the signal and masker. Since the difference between the means of the two density functions is a function of signal amplitude, d' is an index of the detectability of a given signal for a given observer. For cases of a normally distributed signal 15S and masker 16S, as represented in FIG. 4, the detectability index (d') in general may be defined as:

$$d' = \frac{u_s - u_m}{\sqrt{0.5(\sigma_m^2 + \sigma_s^2)}}$$

where
$u_s$ is the mean of the distribution of the signal 15S,
$u_m$ is the mean of the distribution of the masker 16S,
$\sigma_s$ is the standard deviation of the above-noted signal distribution, and
$\sigma_m$ is the standard deviation of the above-noted masker distribution.

The quantity d' represents the mean difference between the two distributions normalized to their common standard deviation. Thus, a higher detectability index would correspond to an increased detectability, while a lower detectability index would correspond to a decreased detectability.

Contrary to prior efforts, the present SAP method 10 of FIG. 1 computes a detectability index for time-varying sounds, which provides a measure of the audibility for one sound, i.e., the signal 15S of FIG. 1, in the presence of another, i.e., the masker(s) 16S. More critically, the present SAP method 10 first computes this channel-specific detectability index $d'_i$ for each $i_{th}$ auditory channel, before aggregating these value to calculate the total detectability index. Such a channel-specific approach or reliance on specific loudness emulates "focus" by the human brain on the prominent frequency component of the signal 15S within a given band over the masker 16S, and thus enables tracking of the signal 15S with time. It is hypothesized herein that focus and attention by a higher-level decision-making processes is due to presence of a feedback mechanism responsible for improved audibility through individual auditory filters. Yet, the SAP method 10 also accounts for the contribution of any additional signal frequency components through other distinct auditory channels, or the buildup of loudness. Consequently, the SAP method 10 accounts for the contribution of additional frequency components of the signal 15S, if present over the masker 16S, through other distinct auditory channels, an affect that is responsible for buildup of loudness and enhance sensitivity.

Figure 5:
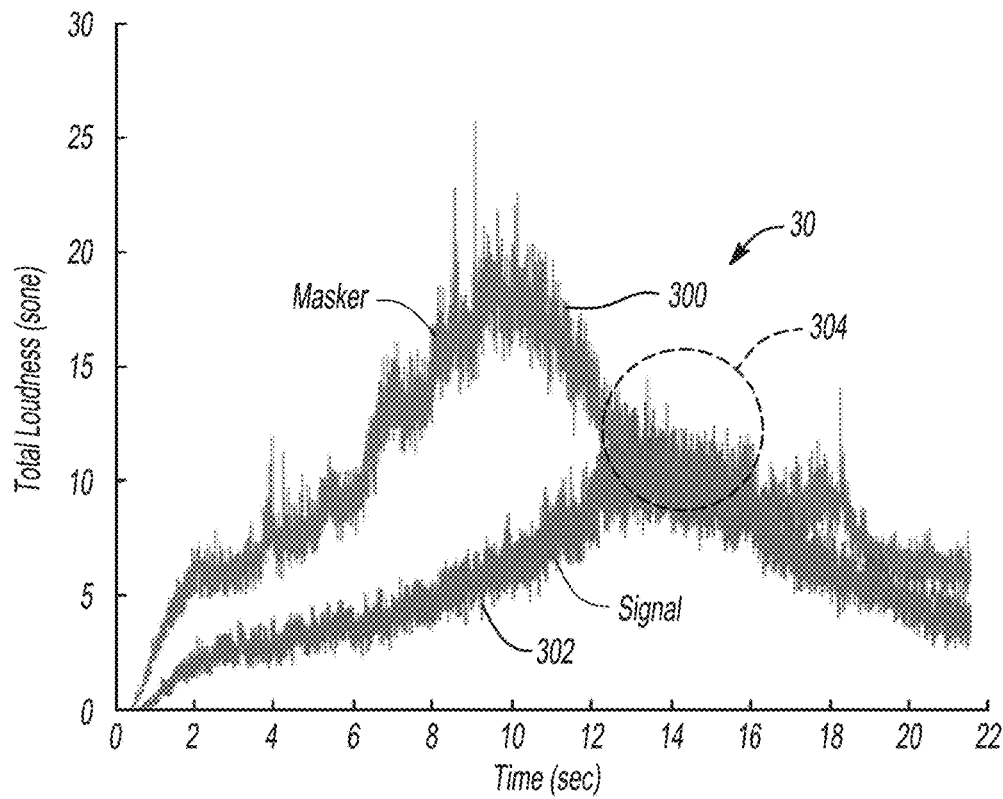
FIGS. 5 and 6 are representative time plots of total instantaneous loudness and specific loudness, respectively, for time-varying sound from the exemplary drone and truck shown in FIG. 2.
Figure 6:
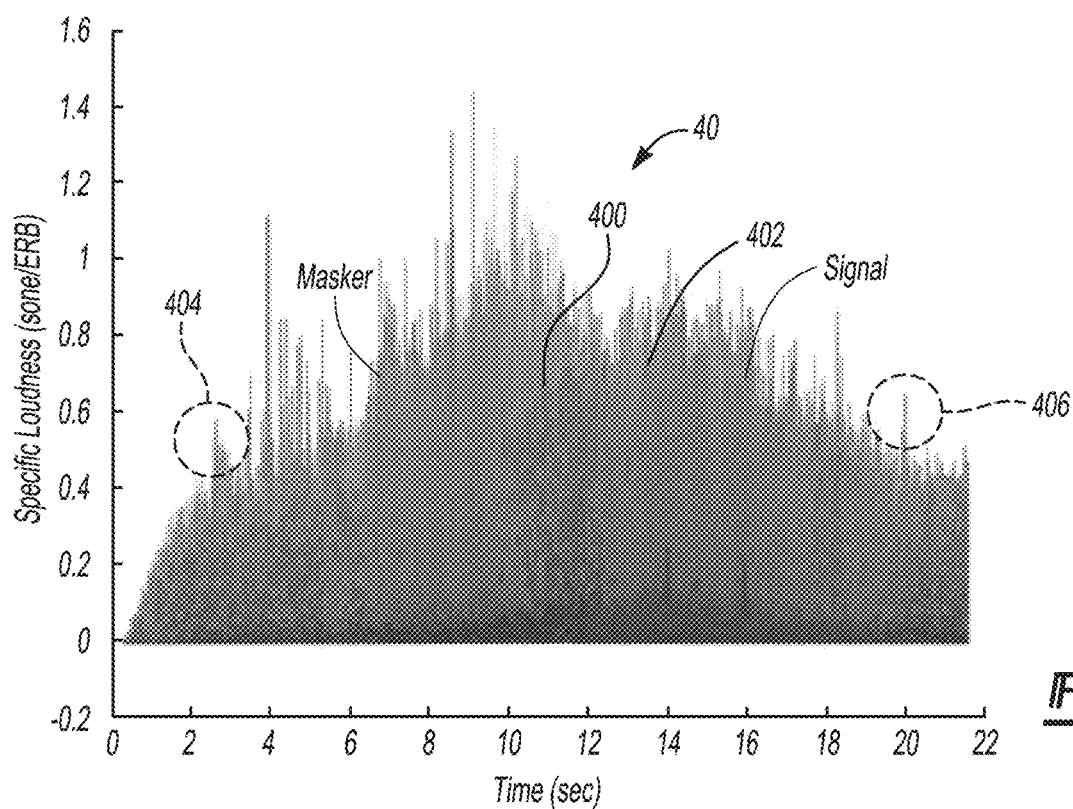
Figure 7:
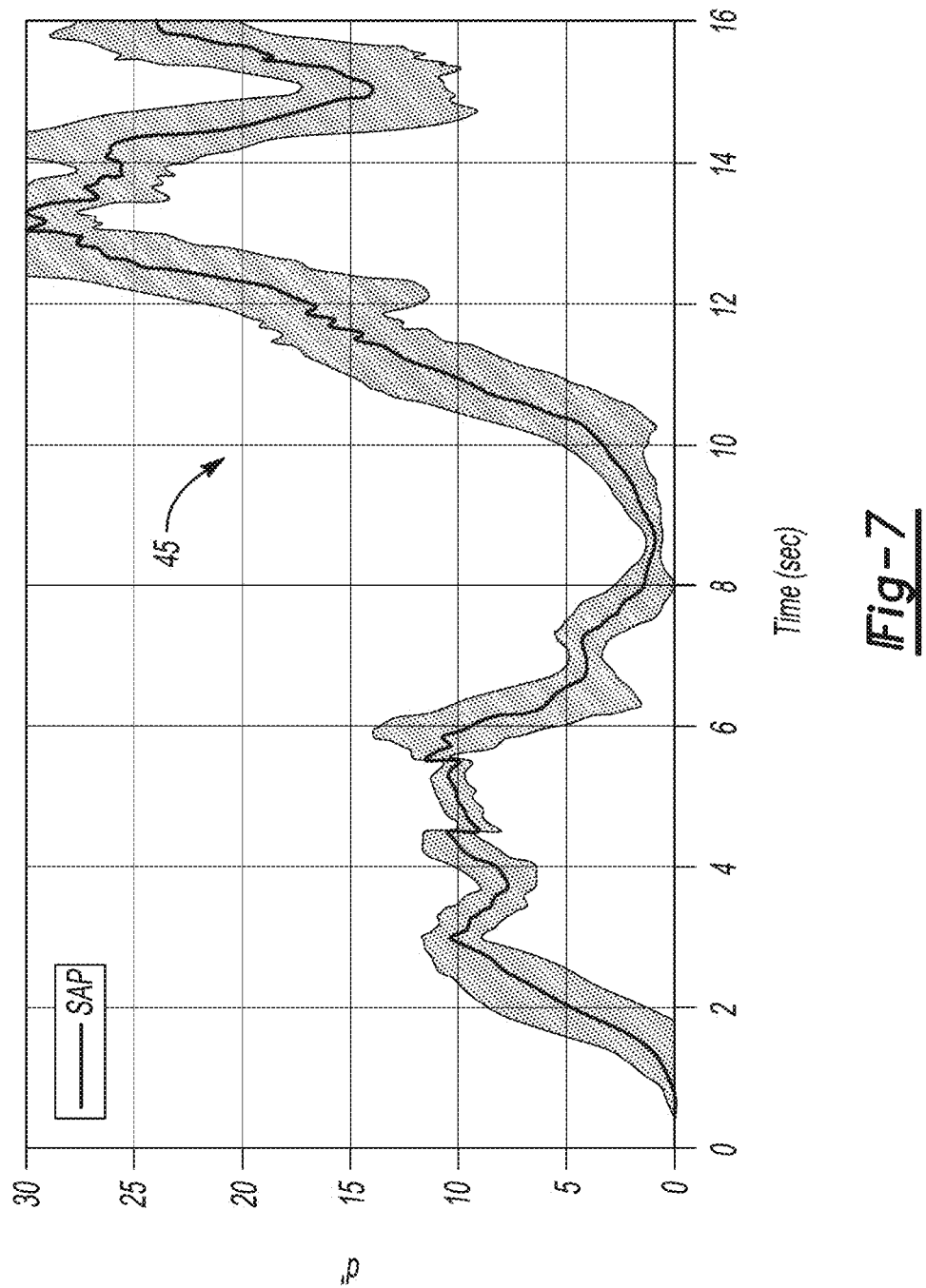
FIG. 7 is a plot of the total detectability index for representative drone sounds with a 95% confidence interval in the presence of truck sounds, in accordance with the non-limiting exemplary scenario illustrated in FIG. 1.

The two exemplary plots 30 and 40 respectively shown in FIGS. 5 and 6 illustrate the importance of such an auditory channel-based audibility modeling approach. In keeping with the non-limiting exemplary scenario in FIG. 2 in which the drone 150 is the signal source 15 and the truck 160 is the masker source 16, trace 300 corresponds to the sound 52 emitted by the truck 160, and thus acts as the masker 16S. Trace 400 for its part corresponds to the sound 51 emitted by the drone 150, and thus acts as the signal 15S. While a comparison of total loudness in FIG. 5 would be conclusive regarding the audibility of trace 302 between about 13 s to 16 s, i.e., in zone 304 where trace 302 temporarily exceeds traces 300, a comparison of specific loudness in FIG. 6 indicates that the exemplary drone sound 51 of FIG. 2 is potentially audible at about 3 s (zone 404) and between 18 s-20 s (zone 406). In other words, the plot 30 of FIG. 5 would indicate that a human listener is unable to hear the signal 15S between 0 s and 13 s, and also after about 16 s, while the plot of FIG. 6 contradicts this. The trace 45 of FIG. 7 presents similar information in a different manner, i.e., as the total detectability index (d') versus time in seconds for drone noise with 95% confidence interval in the presence of trick noise, i.e., the exemplary scenario of FIG. 2. FIG. 7 shows increased audibility between about 2.5 s and 5 s, and later between about 12 s and 14.5 s, as indicated by the relatively high total detectability index (d').

SAP Method (10): an embodiment of the SAP method 10 of FIG. 1 as described below uses the following parameters, with i=1, 2, 3, . . . , p, where p=39 in this example:

Instantaneous Loudness (IL): the total loudness (N) computed in 1-ms time intervals, i.e.:

$$IL = \Sigma_{i=1}^{i=p} N'(i),$$

Instantaneous Specific Loudness (ISL): loudness per ERB for each auditory filter at 1-ms time intervals, i.e.:

$$ISL(i) = N'(i),$$

Instantaneous Specific Partial Loudness (ISPL): positive difference between the ISL of the signal 15S and the ISL of the masker 16S:

$$ISPL = sgn(N'_s(i) - N'_m(i))$$

with sgn(x):=0 if x<0 and x if x≥0; and

Instantaneous Partial Loudness (IPL): sum of positive difference between the IL of the acoustic signal and the IL of the masking signal:

$$IPL = \Sigma_{i=1}^{i=p} sgn(N'_s(i) - N'_m(i)).$$

Figure 8:
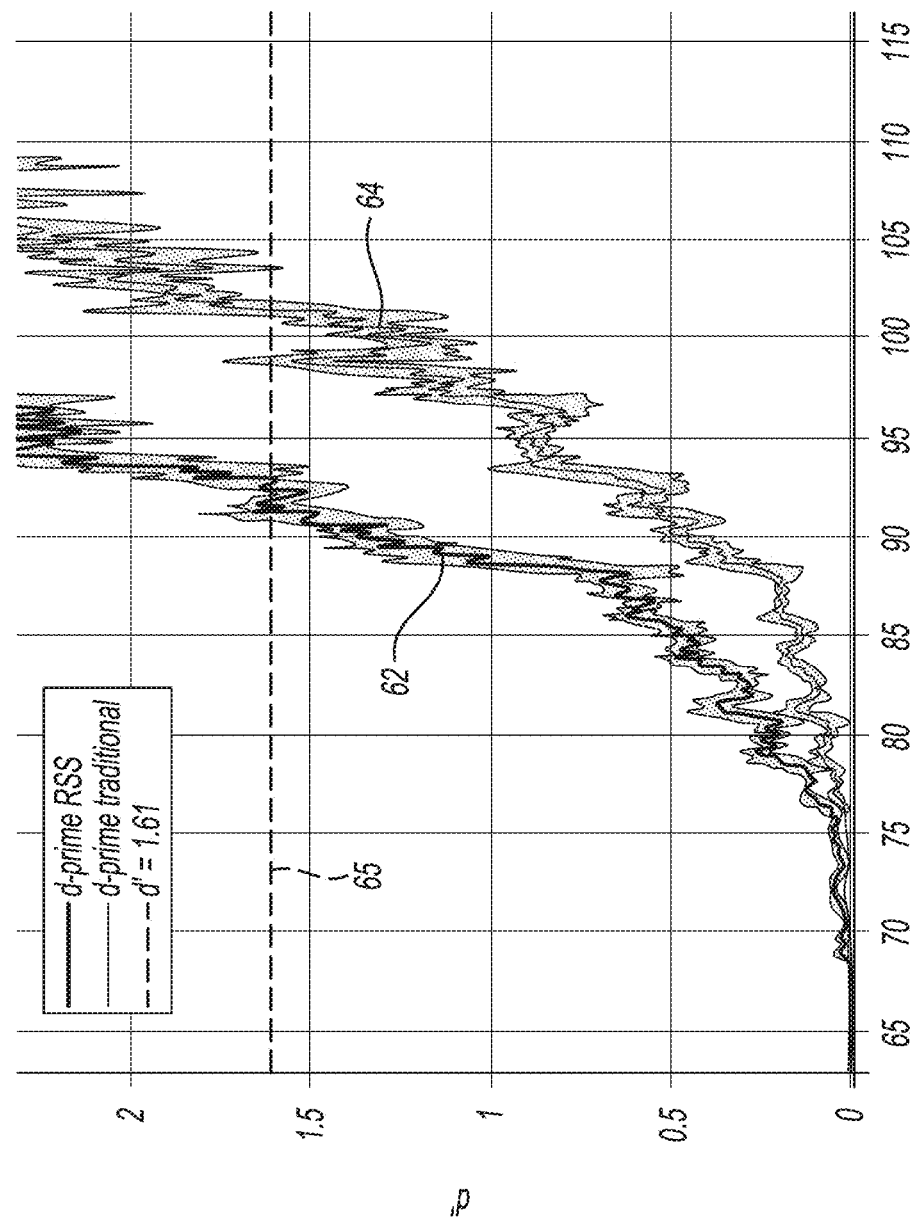
FIG. 8 is a comparative plot of the total detectability index for complex helicopter sounds together with a 95% confidence interval in the presence of ambient sound, with the total detectability index depicted on the vertical axis and time in seconds depicted on the horizontal axis.

Referring now to FIG. 8, another time plot 60 is presented for two prediction methods for a time-varying helicopter sound in the presence of background noise of a typical urban environment. As with FIG. 7, the detectability index (d') is depicted on the vertical axis, and time (t) in seconds (s) is depicted on the horizontal axis. Trace 62 illustrates the performance of the present SAP method 10, in contrast to trace 64 of a competing methodology using mean IPL in the numerator of the equation for the channel-specific detectability index $d'_i$ as set forth below. The underlying methodology of trace 64 likewise does not rely on determining a detectability index on individual auditory channels and the Root of Sum of Squares (RSS) aggregation described below.

In a possible implementation of the SAP method 10, the loudness model 25 of FIG. 1 receives two concurrent sound pressure time history samples designated as the signal 15S and the masker 16S. For example, one or more microphones may be used to record the concurrent sound pressure time history samples, which are then used by the loudness model 25 to compute the above-described input signals 19, i.e., the IL, ISL, and ISPL, for both the signal 15S and the masker 16S, such that channel-specific loudness over time information similar to that which is depicted in FIG. 3 is computed and made available to the SAP device 12. The ISPL may be calculated as the positive difference of the ISL of the signal 15S over the ISL of the masker 16S.

Next, the SAP device 12 may down-sample the various instantaneous parameters IL, ISL, and ISPL, for both the signal 15S and the masker 16S, e.g., by computing a running average of ten values. This action results in decimation to a 10-ms sample rate, as appreciated in the art. The actual duration of this running average window is arbitrary, with 1-s being merely exemplary, but should be chosen in the context of the time duration used for a sliding time interval for computing d'.

That is, the processor 13 of the SAP device 12 computes d' for a 1-s sliding time interval. Additionally, the SAP device 12 when performing the SAP method 10 may compute the standard deviation, for each auditory channel i, of the signal 15S and the masker 16S. The nominal 1-s sliding time interval in this instance represents the conscious perception of loudness while preventing variability of very small sample size distributions. The choice of 1-s is also meant to discount impact on the auditory threshold due to temporal aggregation with increased stimulus duration up to 200-ms. However, shorter time intervals could also be considered within the scope of the disclosure, e.g., if better tracking of time-varying signals is desired.

Thereafter, the processor 13 of FIG. 1 computes a pooled (or equivalent) loudness standard deviation, which is shown in the denominator of the following equation, plus a small variance correction $\sigma_{ci}^2$. The latter value, i.e., the small variance correction $\sigma_{ci}^2$, may be included to smooth out the detectability index ($d'_{t,i}$) when both the denominator and the numerator in the following expression are very small, and negligible when the denominator and numerator are larger.

The processor 13 then computes the auditory channel-specific sensitivity $d'_i$ at time t and for auditory channel i as the mean of the ISPL for the 1-s time span, divided by its respective pooled standard deviation:

$$d'_{t,i} = \frac{\text{mean}(ISPL_i)}{\sqrt{0.5 * (\sigma_{mt,i}^2 + \sigma_{st,i}^2) + \sigma_{ci}^2}}$$

for i=1, 2, 3, ... p. This is followed by computing the total or overall $d'_t$ by aggregating the channel-specific sensitivities $d'_i$ for the individual auditory channels, e.g., based on a Root of Sum of Square (RSS) relation, as follows:

$$d'_t = \left(\sum_{i=1}^{i=n}(d'_{t,i})^2\right)^{\frac{1}{2}}$$

once again for i=1, 2, 3, ... p.

The Nature of Input Samples: as described above, the SAP method 10 relies on two sound pressure time series, designated as signal 15S and masker 16S, i.e., noise or a competing sound not typically classified as noise in a digital signal processing context. During implementation of the SAP method 10, two types of inputs have been considered: (a) computed inputs, which are typically the outcome of a computation or synthesis process with low intrinsic background noise, and (b) measured inputs, e.g., originating from actual recordings of the signal 15S and masker 16S with substantial unintentional background noise. Hereafter, the recordings of the second type are referred to as "measured recordings", as opposed to "intended recordings" that would not include ambient noise.

A listener would not interpret confounding noise as the signal 15S, and would intuitively combine such noise with the masker 16S. When measured with the intended masker 16S, such ambient noise simply gets added to the masker 16S. Calculations remain consistent with how the listener experiences audibility. However, if this ambient noise is measured as part of the recording of the signal 15S of FIG. 1, the SAP method 10 will treat it as part of the signal 15S for the purpose of the relevant calculations. This in turn leads to unrealistically high detectability index s, i.e., d', that do not match a listener's experience.

The signal 15S cannot easily be separated from ambient noise directly. Therefore, an indirect method may be used with the masker 16S to produce an ambient noise correction. This action is intended to approximate the average confounding presence of high ambient noise in a recorded signal 15S rather than directly capturing the noise. The measured masker 16S may be shifted in time in order to capture the strength of the ambient noise. That is, one may take a snippet of a master recording of duration T from time step t to timestep t+T, and declare this to be the masker 16S. One may then choose some time offset k and take another snippet of the masker 16S recording from time step t+k to time step $t+_k+T$, then declare this to be the signal 15S. The offsetting time is relatively small, for instance 5 ms to 15 ms, so as to prevent excessive time averaging of the masker and avoid issues with potentially non-stationary maskers 16S, but it is not so small that the autocorrelation of the masker might confound results.

Figure 9:
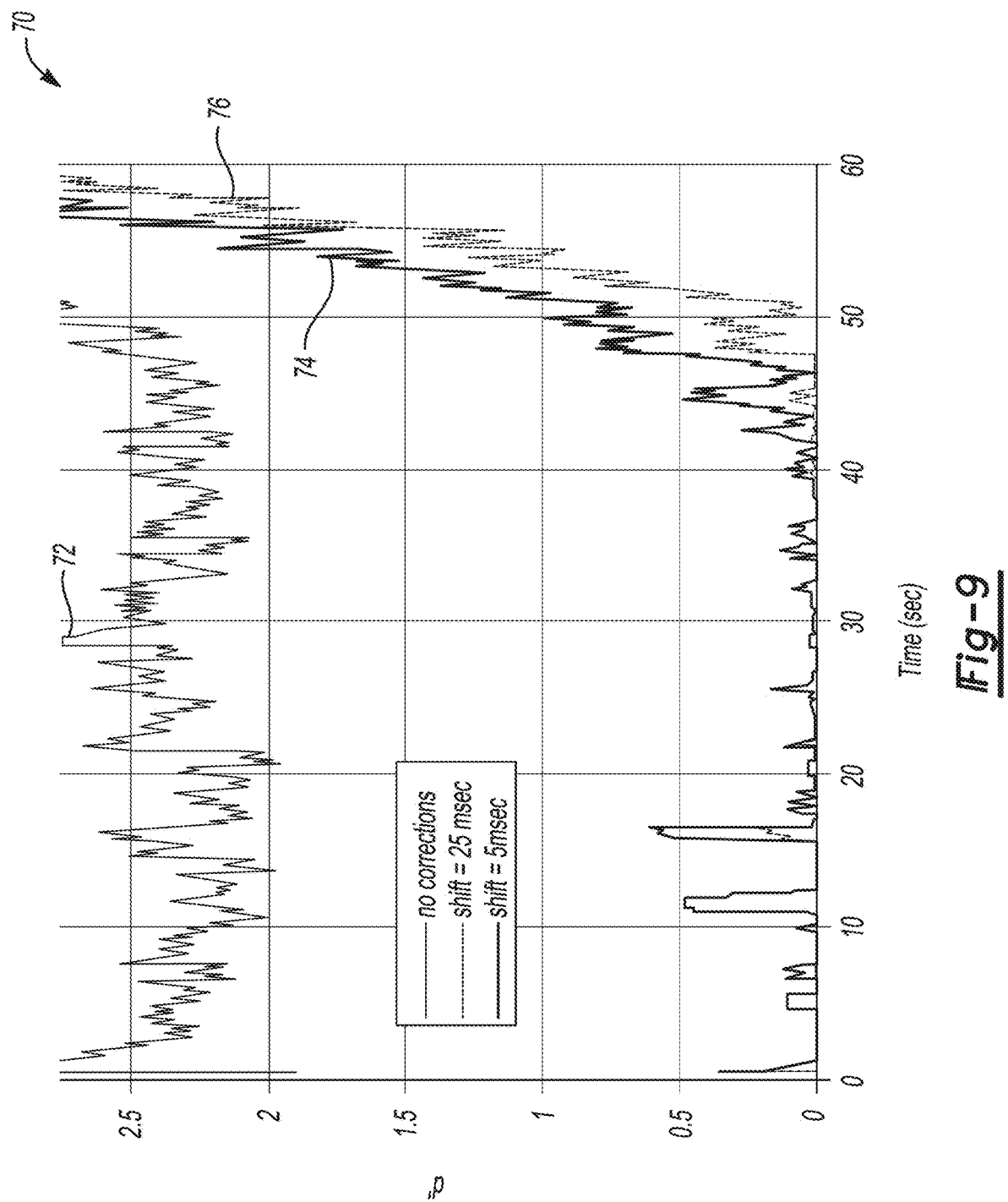
FIG. 9 illustrates the total detectability index using actual recordings of the signal and masker, both before and after correction using an exemplary shift approach.

The masker 16S recording with confounding ambient noise is selected for this process because the two resulting time series will overlap and have nearly identical power spectra, but would not have precisely the same values in any one time step. Thus, between declared masker 16S and declared signal 15S the present approach may calculate an ISPL that would be non-zero, but at a relatively constant and likely inaudible level. The masker-to-masker ISPL from this comparison, averaged over time, can then be used as an ambient bias correction term against the real ISPL between the masker 16S and signal 15S. The plot 70 shown in FIG. 9 illustrates a baseline (trace 72) in which this correction is not applied, and contrasts this performance with corrections performed using different time offsets, i.e., 5 ms (trace 74) and 25 ms (trace 76), to discount the impact of ambient noise present in the original recordings. The aforementioned process may be effectively used on various sound recordings, including the representative helicopter noise discussed above.

Regarding the above-noted channel-specific detection index, this value can be calculated as follows:

$$d'_{t,i} = \frac{\text{mean}(ISPL_i)}{\sqrt{0.5(\sigma_{m\,t,i}^2 + \sigma_{s\,t,i}^2) + \sigma_{ci}^2}} + k_i$$

where $k_i$ is a frequency-dependent correction value for an $i_{th}$ auditory channel to account for the ability to hear the signal 15S below a level of the masker 16S. $k_i$ may be applied regardless of time instant when the value of ($d'_t$) in each auditory channel exceeds 0.15.

Figure 10:
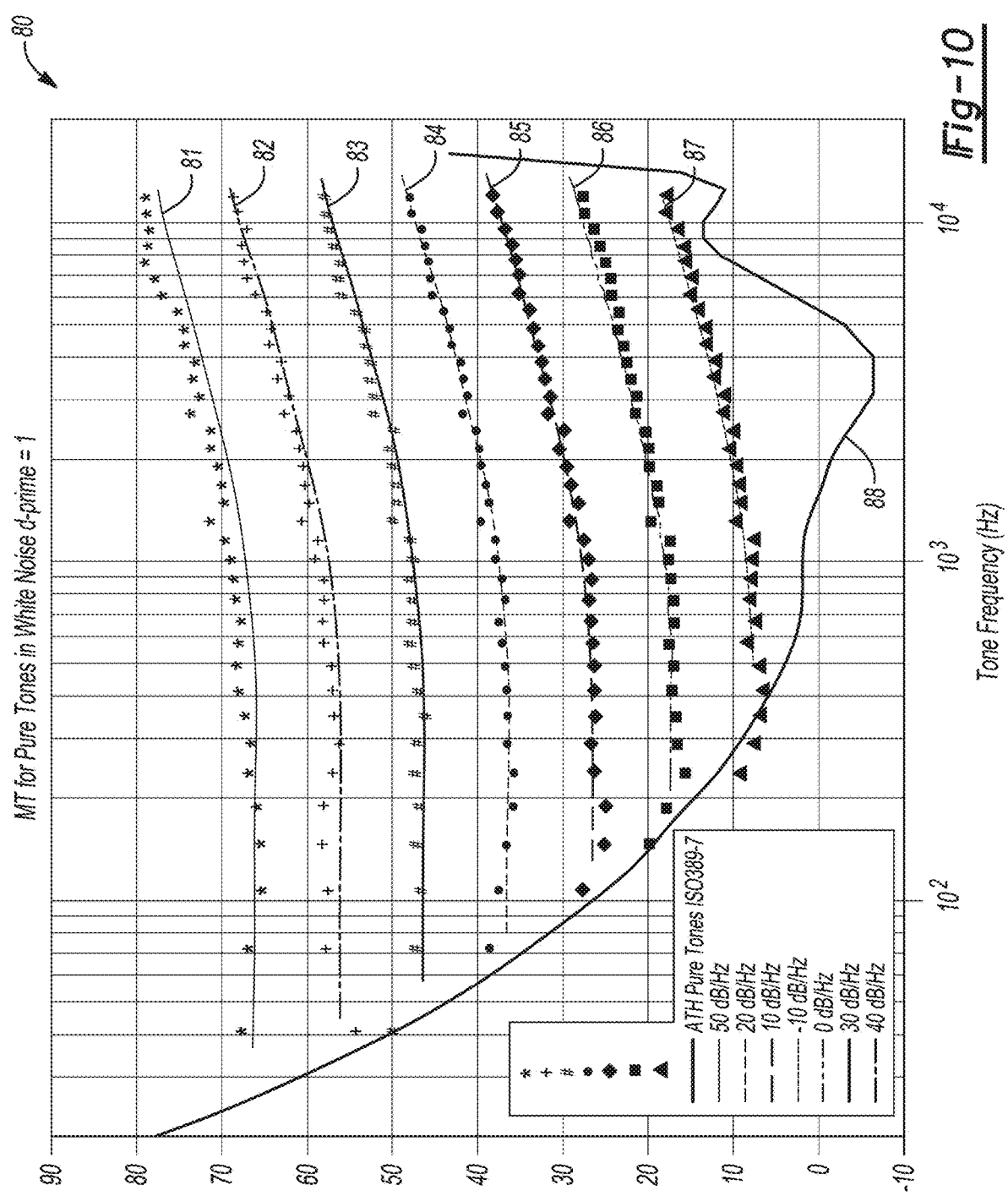
FIG. 10 is a plot of the performance of the present SAP method against audibility data collected for different pure tone signals presented against white noise maskers of different levels.

Referring now to FIG. 10, the presently described SAP method 10 accounts for higher frequency tones and tone levels. As noted above, loudness basically captures the perceived strength of sound on the absolute scale. The SAP method 10 compares the specific loudness, i.e., the loudness as captured within a single auditory filter, of the given signal to the specific loudness of a given masker 16S. This approach is unique in capturing the ability of an auditory system to focus and track the most prominent component of the signal as it may be present through the auditory filter. However, a human auditory system enables one to also hear a signal 15S in the presence of a masker 16S even when the level of the signal 15S is below the level of the masker 16S. Such an example is shown in FIG. 6. Thus, the SAP method 10 as described above accounts for the ability to hear the signal 15S below the level of the masker 16S. This illustrates the performance of the SAP method 10 for pure tones at different levels of the masker 16S, and extended frequency ranges.

FIG. 10 presents representative audibility data for different pure tone signals at different frequencies and levels in the presence of white noise. To develop a frequency-dependent correction for audibility predictions, the SAP method 10 may include (1) generation of different tones with ramping levels and masking noise for each depicted curve, (2) computation of audibility for the specific loudness of each combination of the signal 15S and masker 16S, and (3) computation of frequency-dependent correction values in terms of d' to match predictions of the SAP method 10 to the data of FIG. 10, assuming d'=1 for all cases. In a possible implementation, the processor 13 of FIG. 1, or an offline device, could generate the different tones and compute audibility for the specific loudness of each signal 15S and masker 16S combination. The processor 13 may likewise compute frequency-dependent correction values in terms of d' to match the predictions of the SAP method 10 to the associated empirical data.

In particular, plot 80 of FIG. 10 includes various representative traces 81, 82, 83, 84, 85, 86, and 87 as empirical data to respective pure tone signals, each in turn masked by white noise of a given density level, as a function of test tone frequency. Traces 81-87 illustrate baseline empirical data showing an ability of listeners to detect the various pure tone signals at different frequencies and levels in the presence of white noise. The various traces 81-87 represent the empirical audibility data for each masker level (dB/Hz) shown in the legend, with nominal symbols (+, *, #, etc.) being predictions by the SAP method 10 for each test tone using the full expression of $d'_t$ as described above. An aspect of the present disclosure includes applying a frequency-dependent correction for audibility predictions of the SAP method 10 of FIG. 1, with the results of such a correction shown as traces 81, 82, 83, 84, 85, 86, and 87. FIG. 11 illustrates a representative set of such frequency-dependent correction values 90 in terms of d', which may be used to match predictions by the SAP method 10 to the empirical data.

The SAP method 10 as set forth above (with reference to FIGS. 1-10) can be implemented as computer-readable code, or may be combined as firmware on suitable hardware. For example, the hardware may include a microphone or a binaural head in addition to processing capability for in-situ recording and audibility assessment of a given sound against a set of prerecorded ambient sounds. Thus, the memory 17 of FIG. 1 forms a computer-readable storage medium on which is recorded instructions for performing the specifically configured SAP method 100. Execution of such instructions by the processor 13 of the SAP device 12 causes the processor 13 to receive, over a plurality of auditory channels, a specific loudness of the signal 15S at the listening location 14 and a specific loudness of the masker 16S at the listening location 14, with the signal 15S and the masker 16S being concurrent signals.

Execution of the instructions likewise causes the processor 13 to calculate, for each respective of the auditory channels, a standard deviation of a distribution of the specific loudness of the signal 15S, and a standard deviation of a distribution of the specific loudness of the masker 16S. Likewise, execution of the instructions causes the processor 13 to calculate corresponding channel-specific detectability indices ($d'_{t,i}$) for each respective one of the auditory channels as a function of the standard deviation of the distribution of the signal 15S and the standard deviation of the distribution of the masker 16S, and to aggregate the corresponding channel-specific detectability indices ($d'_{t,i}$) to produce a total detectability index ($d'_t$). The processor 13 thereafter outputs the total detectability index ($d'_t$) as an electronic signal indicative of the predicted audibility vs. or over time of the signal.

A wide range of applications could benefit from improved accuracy of predicted audibility of emitted sounds within a given environment, and from improved accuracy when identifying the particular reasons for/root causes of such audibility.

For instance, applications potentially benefiting from the capabilities of the SAP method 10 include, but are not limited to, office/work space ambient noise design for privacy, transportation vehicle crew/passenger cabin space design validation for noise audibility, and alarm or telephone ring sound audibility validation in presence of different ambient noise. Likewise, the designs of airborne, terrestrial, or marine vehicles, industrial factories and related equipment, and other traditionally loud machinery could be optimized to produce acoustic signatures having much-reduced noise levels for a given population of listeners, or to render the emitted noise levels inaudible. Such capabilities would also facilitate the development of quieter interior spaces, such as passenger or crew cabins located in proximity to noisy propulsion system components aboard, e.g., aircraft, trains, watercraft, or road vehicles. Still other applications would benefit from ensuring that emitted sounds from a given device remain audible, e.g., over ambient/background noise levels, for instance the above-noted telephone or an audible alarm within a noisy industrial facility. These and other potential benefits, in view of the foregoing disclosure, will be readily appreciated buy those skilled in the art.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. A statistical audibility prediction (SAP) method for predicting audibility over time (t), at a listening location, of a signal from a signal source in the presence of a masker from a masking source, the SAP method comprising:
   receiving, via a processor over a plurality (p) of auditory channels, where i represents each respective one of the auditory channels, a specific loudness of the signal at the listening location and a specific loudness of the masker at the listening location, wherein the signal and the masker are concurrent signals;
   calculating, via the processor for each respective of the auditory channels, a standard deviation of a distribution of the specific loudness of the signal, and a standard deviation of a distribution of the specific loudness of the masker;
   calculating, via the processor, corresponding channel-specific detectability indices ($d'_{t,i}$) for each respective one of the auditory channels as a function of the standard deviation of the distribution of the signal and the standard deviation of the distribution of the masker;

aggregating the corresponding channel-specific detectability indices ($d'_{t,i}$) to produce a total detectability index ($d'_t$); and outputting the total detectability index ($d'_t$) as an electronic signal indicative of the predicted audibility over time of the signal.

2. The method of claim 1, wherein outputting the total detectability index ($d'_t$) as an electronic signal includes transmitting the electronic signal to a downstream process and/or system via the processor.

3. The method of claim 1, wherein aggregating the channel-specific detectability indices ($d'_{t,i}$) includes using a Root of Sum of Square (RSS) relation.

4. The method of claim 3, wherein using the RSS relation includes solving the following equation via the processor:

$$d'_t = \left(\sum_{i=1}^{i=p}(d'_{t,i})^2\right)^{\frac{1}{2}}.$$

5. The method of claim 1, further comprising modifying a design and/or an operation of the signal source in response to the electronic signal.

6. The method of claim 1, further comprising modifying a design and/or an operation of the listening location in response to the electronic signal.

7. The method of claim 1, further comprising:
recording the signal and the masker as recorded input signals; and
calculating the specific loudness of the signal and the specific loudness of the masker using the recorded input signals.

8. The method of claim 1, wherein calculating the channel-specific detectability indices ($d'_{t,i}$) includes solving via the processor, for each respective one (i) of the auditory channels, the following equation:

$$d'_{t,i} = \frac{\text{mean}(ISPL_i)}{\sqrt{0.5(\sigma^2_{mt,i} + \sigma^2_{st,i}) + \sigma^2_{ci}}} + k_i$$

where t is time, mean (ISPL) is the mean instantaneous specific partial loudness, $\sigma_s$ is the standard deviation of the distribution of the signal, $\sigma_m$ is the standard deviation of the distribution of the masker, $\sigma_c^2$ is a predetermined correction factor, and $k_i$ is a frequency-dependent correction value for an $i_{th}$ auditory channel to account for the ability to hear the signal below a level of the masker.

9. The method of claim 8, further comprising selectively adding the frequency-dependent correction value when the value of $d'_{t,i}$ in each auditory channel exceeds 0.15.

10. A computer-readable storage medium on which is recorded instructions for predicting audibility over time (t), at a listening location, of a signal from a signal source in the presence of a masker from a masking source, wherein execution of the recorded instructions by a processor of a statistical audibility prediction device causes the processor to:
receive, over a plurality (p) of auditory channels, where i represents each respective one of the auditory channels, a specific loudness of the signal at the listening location and a specific loudness of the masker at the listening location, wherein the signal and the masker are concurrent signals;

calculate, via the processor for each respective of the auditory channels, a standard deviation of a distribution of the specific loudness of the signal, and a standard deviation of a distribution of the specific loudness of the masker;

calculate, via the processor, corresponding channel-specific detectability indices ($d'_{t,i}$) for each respective one of the auditory channels as a function of the standard deviation of the distribution of the signal and the standard deviation of the distribution of the masker;

aggregate the corresponding channel-specific detectability indices ($d'_{t,i}$) to produce a total detectability index ($d'_t$); and output the total detectability index ($d'_t$) as an electronic signal indicative of the predicted audibility over time of the signal.

11. The computer-readable storage medium of claim 10, wherein the execution of the recorded instructions by the processor causes the processor to transmit the electronic signal to a downstream process and/or system.

12. The computer-readable storage medium of claim 10, wherein the execution of the recorded instructions by the processor causes the processor to aggregate the channel-specific detectability indices ($d'_{t,i}$) using a Root of Sum of Square (RSS) relation.

13. The computer-readable storage medium of claim 12, wherein the execution of the recorded instructions by the processor causes the processor to use the RSS relation by solving the following equation:

$$d'_t = \left(\sum_{i=1}^{i=p}(d'_{t,i})^2\right)^{\frac{1}{2}}.$$

14. The computer-readable storage medium of claim 10, wherein the execution of the recorded instructions by the processor causes the processor to request a modification of a design and/or operation of the signal source in response to the electronic signal.

15. The computer-readable storage medium of claim 10, wherein the execution of the recorded instructions by the processor causes the processor to request modification of a design and/or operation of the listening location in response to the electronic signal.

16. The computer-readable storage medium of claim 10, wherein execution of the recorded instructions by the processor causes the processor to record the signal and the masker as recorded input signals; and
calculate the specific loudness of the signal and the specific loudness of the masker using the recorded input signals.

17. The computer-readable storage medium of claim 10, wherein execution of the recorded instructions by the processor causes the processor to calculate the channel-specific detectability indices ($d'_{t,i}$) by solving, for each respective one (i) of the auditory channels, the following equation:

$$d'_{t,i} = \frac{\text{mean}(ISPL_i)}{\sqrt{0.5(\sigma^2_{m\ t,i} + \sigma^2_{s\ t,i}) + \sigma^2_{ci}}} + k_i$$

where mean (ISPL) is the mean instantaneous specific partial loudness, $\sigma_s$ is the standard deviation of the distribution of the signal, om is the standard deviation of the distribution of the masker, $\sigma_{ci}^2$ is a predetermined correction factor, and $k_i$ is a frequency-dependent correction value for an $i_{th}$ auditory channel to account for the ability to hear the signal below a level of the masker.

18. The computer-readable storage medium of claim 17, wherein execution of the recorded instructions by the processor causes the processor to selectively add the frequency-dependent correction value when the value of $d'_{t,i}$ in each auditory channel exceeds 0.15.

19. A statistical audibility prediction method for predicting audibility over time (t), at a listening location, of a signal from a signal source in the presence of a masker from a masking source, comprising:
concurrently recording the signal and the masker at the listening location as recorded input signals;
calculating using the recorded input signals, for a plurality of auditory channels (p), a specific loudness of the signal and a specific loudness of the masker;
calculating, via the processor for each respective one of the auditory channels (i), a standard deviation of a distribution of the specific loudness of the signal, and a standard deviation of a distribution of the specific loudness of the masker;
calculating, via the processor, corresponding channel-specific detectability indices ($d'_{t,i}$) for each respective one of the auditory channels as a function of the standard deviation of the distribution of the signal and the standard deviation of the distribution of the masker;
aggregating the corresponding channel-specific detectability indices ($d'_{t,i}$) to produce a total detectability index ($d'_t$), using a Root of Sum of Square (RSS) relation; and outputting the total detectability index ($d'_t$) as an electronic signal indicative of the predicted audibility over time of the signal, wherein the RSS relation includes solving the following equation via the processor:

$$d'_t = \left(\sum_{i=1}^{i=p}(d'_{t,i})^2\right)^{\frac{1}{2}}.$$

20. The method of claim 19, wherein calculating the channel-specific detectability indices ($d'_{t,i}$) includes solving via the processor, for each respective one (i) of the auditory channels, the following equation:

$$d'_{t,i} = \frac{\text{mean}(ISPL_i)}{\sqrt{0.5(\sigma^2_{m\ t,i} + \sigma^2_{s\ t,i}) + \sigma^2_{ci}}} + k_i$$

where mean (ISPL) is the mean instantaneous specific partial loudness, $\sigma_s$ is the standard deviation of the distribution of the signal, $\sigma_m$ is the standard deviation of the distribution of the masker, $\sigma_{ci}^2$ is a predetermined correction factor, and $k_i$ is a frequency-dependent correction value for an $i_{th}$ auditory channel to account for the ability to hear the signal below a level of the masker.

* * * * *